Patented Oct. 8, 1946

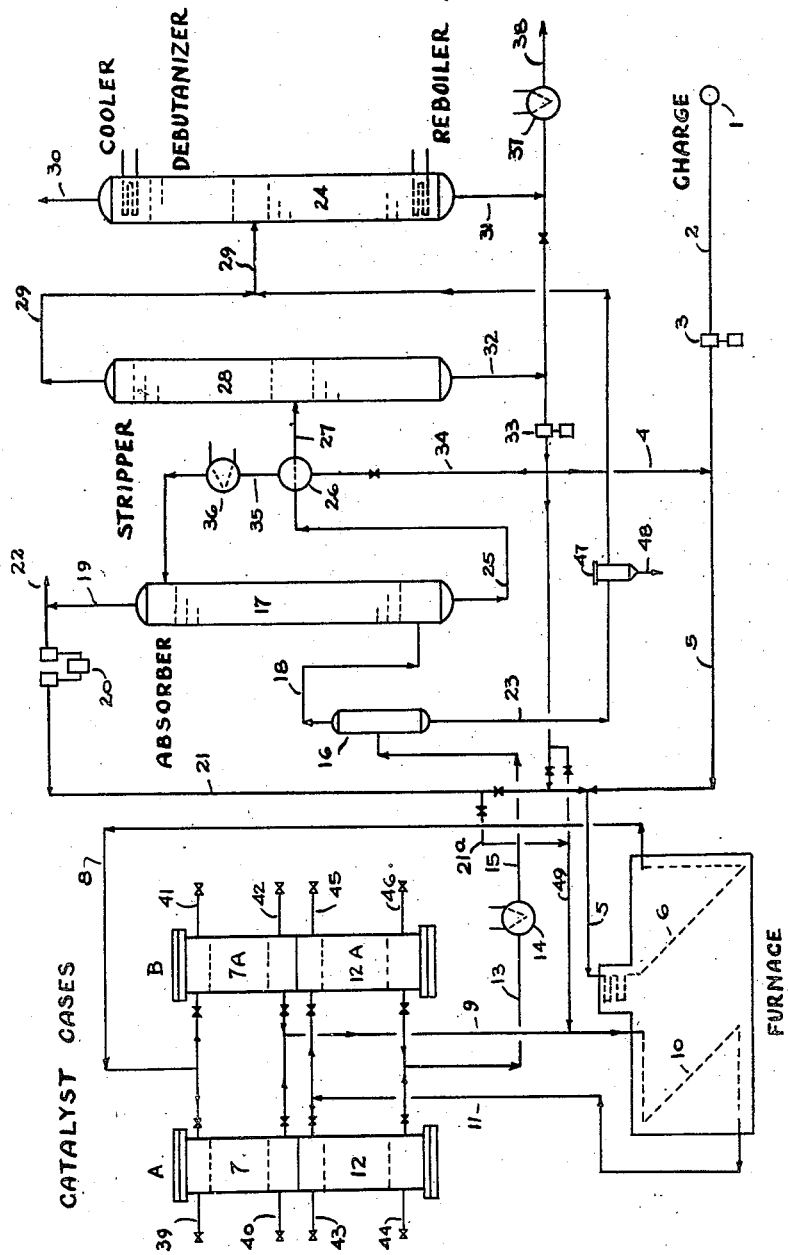

2,408,948

UNITED STATES PATENT OFFICE 2,408,948

CATALYTIC HYDROCARBON REFORMING PROCESS

Cecilio L. Ocon and Ernest A. Ocon, Yonkers, N. Y.; said Cecilio L. Ocon assignor to said Ernest A. Ocon Application September 14, 1940, Serial No. 356,886

11 Claims. (Cl. 196—52)

This invention relates to a catalytic process for the manufacture of high anti-knock gasoline from lower anti-knock distillates, e. g. straight run gasoline, natural gasoline and naphtha range hydrocarbons.

More specifically, the present process is concerned with catalytic reforming of naphthas having low commercial value for their conversion into high quality motor fuels with a minimum of inferior by-products.

The present invention may be used as an integral part of a combination topping and cracking plant or as an independent improved multiple stage catalytic reforming of hydrocarbon reactants.

The flow rate of the reactants and the amount of catalytic surface contacted in each stage of the reforming treatment can be adjusted to obtain a maximum and uniform utilization of each catalyst bed simply by determining and analyzing the temperature differential between the point of entry and exit of the reaction mixture for each catalyst bed. By this means guess-work is eliminated. The number of catalyst beds can be varied to obtain any desired degree of conversion and each stage of treatment can be controlled to prevent insufficient or excessive temperature drop, which denote under and over-reaction respectively. The control can thus also be made with great precision during the entire period that a catalyst bed is in use, for even though the bed becomes gradually deactivated, adjustment of the flow rate of the reactants and admixed refractory gases maintain the correct amount of reaction indicated by a proper temperature differential.

For the usual naphtha range charging stock, the highest useful catalytic reforming reaction temperature comes within the approximate narrow critical limits of 925° to 1050° F. In other words, the temperature of the reactants entering a catalyst bed should be preferably kept within this range. In passing through an individual catalyst bed, the temperature drop of the reaction mixture should be at least of the order of about 25° F. and a maximum of about 100° F., while the reactor is maintained at substantially the average reaction temperature, i. e. within the range of 875° F. to 1025° F.

Accordingly, following the first stage of reaction in the initial catalyst bed and intermediate the following stages of reaction, the reaction mixture is reheated outside the enclosed catalytic reaction zones preferably by passage through a heating zone maintained at a high temperature with rapid heat absorption, e. g. a radiant heat coil at a temperature above 1150° F., so that the reheating occurs very rapidly without substantial thermal decomposition. This reheating to raise the temperature of the reaction mixture again to the desired reaction level in transit between catalyst beds can be accomplished in less than one minute, and even in a period of a very few seconds.

In the practice of this invention with low anti-knock distillates such as straight run petroleum naphtha or a similar charging stock which has not been changed previously to a substantial degree by reforming or cracking into a product of substantial unsaturated character, the initial preheating and the catalytic reforming in the initial stage can be carried out advantageously without admixing hydrogen or low boiling normally gaseous hydrocarbons present in recycled products such as the absorber tail gas, which gas tends to lower the reforming reaction. More beneficially the normally gaseous and highly refractory products are added to the reaction mixture as it is passed to the following reheating zones and catalyst beds to restrict thermal decomposition and reduce side reactions.

Although the operation has been described as having the meritorious advantages of affording a more exact control of the reaction in each catalytic reaction zone and in economically simplifying the apparatus, it includes a number of additional benefits which become more apparent in the actual operation. For example, the periods of changing the reactors from the reaction to the regeneration phases of the cycle, and vice versa, are greatly expedited by decreasing the need of indirect heat exchange in the reactor with heating and cooling media.

The individual catalyst beds are separately enclosed in sections of a reactor drum or are disposed in a manner to permit the flow of a controlled stream of reactor mixture through each bed over any period of time. The important factor is that the passage of reactants through any reaction zone or catalyst bed is independently controllable, regardless of whether there are one or a plurality of beds in a single reaction vessel. For economy a plurality of controllable catalyst reaction zones are preferably located in a single vessel, each zone having its individual inlets and outlets by which the stream of reaction mixture enters and leaves the zone.

The vessel in which the catalyst zones are enclosed may be heat insulated, provided with external heat exchange jackets, or internal exchange means to any extent desired. However these can be greatly simplified by experimentation and use of heat balance calculations, because with the reacants of reaction mixture entering the individual reaction zone at a suitable level of temperature described as the highest useful reaction temperature the reaction zone can be maintained at very nearly within the desired reaction temperature range of 875 to 1025° F., with simply sufficient insulation or heat input to compensate for heat losses from the zone to outside the system by radiation, conduction, or convection.

While the reaction zone is thus maintained at a desired average reaction temperature level, the temperature drop in the reaction mixture from the entrance to the exit of the reaction zone can be readily imputed to the net endothermic heat of reaction, which is a satisfactory measure of the extent of reaction. Accordingly, the present process permits satisfactory control of reaction conditions through the temperature differential measurements, whereas control of other processes depend on trial and error methods for each type of charging stock, the catalyst in use, the products formed, etc.

The process with its objects and advantages will be more fully understood from the following detailed description and accompanying drawing, which is a schematic flow diagram illustrating one type of apparatus and its operation for use with the present invention.

Referring to the drawing, a feed of low boiling liquid hydrocarbon reactants such as one boiling in the naphtha range is pumped from tank 1 by pump 2 through line 3 where it may be combined with stripper bottoms and part of a debutanizer bottoms which jointly flow through line 4. The naphtha charging stock or the mixture of naphtha with stripper and/or debutanizer bottoms flows through line 5 jointly with compressed tail gas from the absorber 17 to the separately fired radiant heat continuous coil 6, wherein the mixture of hydrocarbons is rapidly heated to approximately 1000° F. before entering the first catalyst bed 7 in catalyst reactor A through line 8. The effluents from the bottom of the catalyst bed 7 in reactor A are withdrawn at about 960° F. through line 9 and passed through a succeeding separately fired radiant heat continuous coil 10 wherein they are again rapidly heated to approximately 1000° F.

The reheated reaction mixture then passes through line 11 and enters a succeeding catalyst bed 12 in said catalyst reactor A. The effluents from the bottom of the catalyst reactor A are withdrawn at about 960° F. through line 13, cooler 14, line 15, into a flash drum 16. The pressure in the reactor is maintained at about 250 lbs. per sq. in. ga.

If desired, the naphtha charging stock may be pumped directly to the radiant coil 6 without the stripper and/or debutanizer bottoms which can be made to flow separately through line 49 jointly with or without the compressed tail gas which can be passed through line 21a to join the effluends flowing through line 9 to the radiant coil 10.

Inasmuch as the net heat of reaction is endothermic, it is necessary to withdraw the reactants and products from the reactors and reheat same in order to supply this endothermic heat and maintain the temperature at the proper reaction level before passing to the succeeding catalyst bed.

The recycle gas, which contains about 50–55 mol percent of hydrogen, with the proper control of the contact time serves to inhibit or minimize the thermal side reactions which are detrimental to the product. After a period of time, coke deposit reduces the activity of the catalyst, and it becomes necessary to reactivate by burning off the coke deposit.

The flash drum gas, which is rich in hydrogen, enters the bottom of the absorber tower 17 through line 18.

The absorber tail gas leaving absorber 17 through line 19 is compressed by compressor 20 and recycled through line 21 where it joins the furnace charge flowing through line 5 or passes through line 21a to join the products flowing through line 49. The remainder of the tail gas flows to the refinery fuel gas system (not shown) through line 22. The condensate from the flash drum 16, flows under the system pressure through line 23 to the debutanizer tower 24. Any water or sludge in the flash drum condensate may be separated in a trap 47, and withdrawn from the system by valved line 48.

The rich oil flows from the bottom of the absorber tower 17 through line 25 to the heat exchanger 26, where it is reheated with heat from the hot lean oil and then passes through line 27 to the stripper tower 28 where the absorbed components are removed overhead.

The stripper overhead vapors enter the debutanizer 24 through line 29 together with the flash drum condensate flowing through line 23. The debutanizer gas containing methane, ethane, propane, butanes and some heavier hydrocarbons is removed from the system through line 30. The bottoms from the debutanizer tower 24 flow through line 31 jointly with the stripper tower bottoms flowing through line 32 being forced by the pump 33. A portion of this blend flows through line 4, as previously described, and the remaining part flows through line 34, heat exchanger 26, line 35 and cooler 36 as the cold lean oil to the top of the absorber tower 17.

It should be stated here that with some naphtha feed stocks it may be possible to use naphtha as lean oil and thus eliminate the stripper tower 28.

The remaining portion of the debutanizer bottoms is passed through water cooler 37 to untreated gasoline storage through line 38 to be treated as rerun. It may be necessary to clay treat or acid treat the raw gasoline when operating to produce aviation-base gasoline to meet the conventional aviation gasoline specifications.

The reactivation of the catalyst is accomplished by burning the coke off the catalyst with an oxygen-bearing flue gas. When the catalyst beds of reactor A become relatively inactive, the reactants are switched to the second reactor B of a similar construction. The inactive reactor is then cut off from the oil system and the activation of the catalysts is accomplished by burning the coke adhered to the catalysts. The reactor pressure is allowed to drop from 250 lbs. per sq. in. ga. to atmospheric and then both catalyst beds are purged with inert gas generated in a flue gas generating furnace (not shown in the diagrammatic drawing). Regeneration is now started by adding air in low concentrations to the flue gas. The oxygen reacts with the coke on the catalyst and burns completely to carbon dioxide. This burning occurs in a comparatively narrow band which starts at the top and moves down the bed. The exothermic heat evolved is absorbed as sensible heat in flue gas, which is heated from 650° F. to 1150° F. After the regeneration both of the catalyst beds are at a temperature of about 650° F.

to 700° F. Therefore, it is necessary to reheat the catalyst to the reaction temperature of about 1,000° F. This is accomplished by preheating the flue gas and it is carried out at a superatmospheric pressure, e. g. 100 lbs. per sq. in. ga. pressure, or higher.

When the reactor beds have been reheated to approximately 1,000° F. the contained flue gas is vented and the pressure is released. The reactor is then repressured to 250 lbs. per sq. in. ga. with the refinery fuel gas. The reactor is then ready to be switched into the reaction system and the other reactor is ready for the regeneration cycle.

Gases used for reactivation are admitted to the upper catalyst bed 7 or 7A and to the lower catalyst bed 12 or 12A of the reactors A or B through connections 39 and 41 or 43 and 45. After passing through the corresponding catalyst beds the flue gases containing admixed gaseous products of the regeneration leave the reactors through the connections 40 and 42 or 44 and 46. Each of the connections is equipped with a valve for controlling or shutting off the flow of the flue gases, or similar inert and reducing gases.

As a specific example of the present invention, a naphtha of approximately 50° A. P. I. and 425° F. end point is charged preferably mixed with compressed hydrogen-rich absorber gas and recycle from the stripper tower bottoms to the furnace where these constituents are heated to a temperature of approximately 1000° F. before being passed at a pressure of approximately 250 lbs. ga. into the first catalyst section for treatment with a suitable catalyst such as chromic oxide on Activated Alumina supports. The effluents from this catalytic treatment which have been lowered in temperature to about 950 to 960° F. are again heated to approximately 1000° F. and then resubjected to catalytic treatment in a second catalyst section. The reacted effluents leave the second catalyst section at about 960° F. and are cooled prior to flashing, absorption and fractionation. Typical results derived from the operation as described above are as follows:

Gasoline (78-80 octane number)
per cent by vol__ 84
Fuel oil_____do____ .3
Dry gas_____per cent by weight__ 12

Other catalysts may be employed advantageously in this process in addition to chromic oxide mentioned above, such as catalysts consisting of oxides or a mixture of oxides of metals of the fourth, fifth and sixth groups of the periodic system supported with Activated Alumina, bauxite, diatomaceous earth, corundum, kieselguhr, pumice, unglazed porcelain and the like.

This process may also be operated at temperature in the range of from about 875 to 1050° F. and under pressures ranging from 150 to 800 lbs. ga. depending on the analysis of the charging stock, catalyst employed and final products desired.

The reactors can be built in pairs or in batteries composed of 4, 6, 8, etc., units. Each of the units may have two or a multiple of two or more catalyst beds.

It is to be understood that all instruments for proper operation such as temperature and pressure controllers, recorders and indicators, flow indicators and controllers, valves, pumps, compressors, liquid level controllers, and all such engineering will be used as is well known in the art, although they are not all shown, indicated or described above.

While we have described the preferred method of operation, it is to be understood that details of procedure and arrangement of apparatus may be varied distinctly from the description given without departing from the scope of the invention.

We claim:

1. A process for catalytically reforming low boiling hydrocarbon reactants of gasoline and naphtha boiling range into high anti-knock motor fuels, which comprises heating a low boiling hydrocarbon reactant charging stock jointly with a hydrogen-bearing gas having approximately 50 mol per cent hydrogen in a heating zone at a superatmospheric pressure ranging from 150 to 800 lbs. per sq. in. ga. to a reaction temperature in the range of 925 to 1050° F. in a short period of time to prevent thermal decomposition, passing the heated reactants into contact with a reforming catalyst bed in an enclosed zone at a suitable space velocity to effect a temperature drop of from 25 to 100° F. more or less by endothermic reaction between points of entry and exit of the reactants, passing the reaction mixture from said catalyst bed to a separate heating zone wherein the reaction mixture is rapidly elevated to a temperature in the range of 925° F. to 1050° F. for a short period of time to prevent thermal decomposition, passing the reheated reaction mixture into contact with a bed of catalyst in an enclosed zone at a suitable space velocity to effect a temperature drop of 25 to 100° F. in the reaction mixture as it is passed therethrough, withdrawing, cooling, and passing said reaction mixture to a flashing zone wherein gas is separated from condensate, passing said gas to an absorption zone, absorbing hydrocarbons having at least 3 carbon atoms to the molecule by contact with a cold lean oil comprising products of the reforming process, passing overhead unabsorbed hydrocarbons as tail gas, compressing and passing a portion of said tail gas to the initial heating zone as the hydrogen-bearing gas, withdrawing, reheating, and passing said lean oil enriched with said absorbed hydrocarbons to a stripping zone for removal of said absorbed hydrocarbons as overhead vapors; and recycling a portion of the stripped lean oil to said heating and catalytic reaction zones to be rapidly heated with said low boiling hydrocarbon reactant charging stock.

2. A process in accordance with claim 1, in which a portion of the tail gas passed overhead from the absorption zone is compressed and heated to a reaction temperature jointly with a portion of stripped lean oil and with said reaction mixture being rapidly elevated to the desired reaction temperature for subsequent contact with said reforming catalyst.

3. A process for catalytically reforming low boiling hydrocarbon reactants of gasoline and naphtha boiling range into high anti-knock motor fuel which comprises, heating an initial reactant charging stock jointly with a hydrogen-bearing gas having approximately 50 mol per cent hydrogen to a reaction temperature of from 925 to 1050° F. under superatmospheric pressure, passing the heated mixture into contact with a reforming catalyst in an enclosed reaction zone, passing the catalytically treated reaction mixture to a high temperature reheating zone wherein said reaction mixture is rapidly elevated to at least its average reaction temperature, passing the reheated reaction mixture into contact with a reforming catalyst in a succeeding enclosed reaction zone, withdrawing, cooling and passing the cooled reaction mixture to a flashing zone for separation of gas from condensate, passing the condensate to a debutanizing zone, separating in said debutanizing zone hydrocarbons having not more than 4 carbon atoms to the molecule from heavier hydrocarbons, and recycling a portion of said heavier hydrocarbons for further heating and catalytic reforming reactions jointly with the reaction mixture.

4. A process in accordance with claim 3, in which a portion of said heavier hydrocarbons is passed as a recycle to the reheating zone with the catalytically treated reaction mixture.

5. In a process for catalytically reforming low boiling hydrocarbon reactants of gasoline and naptha boiling range comprising the heating of said reactants to a reaction temperature in a preheating zone, passing the heated reactants through a reforming catalyst in an enclosed reaction zone maintained at a desired reaction temperature, withdrawing the reaction products from said reaction zone, reheating said reaction products to the desired reaction temperature in a reheating zone, passing the reheated reactant products through a reforming catalyst in a succeeding enclosed reaction zone, withdrawing, cooling and passing said reaction mixtures to a flashing zone for separation of gas from condensate, the improvement which comprises passing said condensate to a debutanizing zone, passing said gas from said flashing zone as overhead vapors to an absorption zone, absorbing therein from said gas hydrocarbons having at least three carbon atoms to the molecule by contact with a relatively cool lean oil comprising products of the reforming process, removed from a stripping zone, withdrawing, heating and passing the resulting enriched lean oil to said stripping zone for removal of absorbed hydrocarbons as overhead vapors, using a portion of said stripped lean oil as the absorbing medium in said absorption zone, passing the released hydrocarbons from said stripping zone to said debutanizing zone, separating in said debutanizing zone hydrocarbons having not more than four carbon atoms to the molecule from heavier hydrocarbons and recycling a portion of said heavier hydrocarbons jointly with a portion of the stripped lean oil from said stripping zone to the initial heating zone wherein it is heated to a reaction temperature jointly with the initial charging stock.

6. A process in accordance with claim 5 in which the unabsorbed hydrocarbons from said absorption zone are withdrawn as overhead tail gas, compressing a portion of said tail gas and passing said compressed tail gas to the initial heating zone as hydrogen-bearing gas to be heated jointly with the initial charging stock for subsequent contact with reforming catalysts.

7. In a process for catalytically reforming low boiling hydrocarbon reactants of gasoline and naptha boiling range comprising the heating of said reactants to a reaction temperature in a preheating zone, passing the heated reactants through a reforming catalyst in an enclosed reaction zone maintained at a desired reaction temperature, withdrawing the reaction products from said reaction zone, reheating said reaction products to the desired reaction temperature in a reheating zone, passing the reheated reactant products through a reforming catalyst in a succeeding enclosed reaction zone, withdrawing, cooling and passing said reaction mixtures to a flashing zone for separation of gas from condensate, the improvement which comprises passing said condensate to a debutanizing zone, passing said gas from said flashing zone as overhead vapors to an absorption zone, absorbing therein from said gas hydrocarbons having at least three carbon atoms to the molecule by contact with a relatively cool lean oil comprising products of said reforming process, removed from a stripping zone, withdrawing, heating and passing the resulting enriched lean oil to said stripping zone for removal of absorbed hydrocarbons as overhead vapors, using a portion of said stripped lean oil as the absorbing medium in said absorption zone, passing the released hydrocarbons from said stripping zone to said debutanizing zone, separating in said debutanizing zone hydrocarbons having not more than four carbon atoms to the molecule from heavier hydrocarbons, and recycling a portion of said heavier hydrocarbons jointly with a portion of the stripped lean oil from said stripping zone to the reheating zone wherein it is reheated to a reaction temperature jointly with the reaction products.

8. A process in accordance with claim 7 in which the unabsorbed hydrocarbons from said absorption zone are withdrawn as overhead tail gas, compressing a portion of said tail gas and passing said compressed tail gas to the reheating zone as hydrogen-bearing gas to be heated jointly with said recycle and the reaction products for subsequent contact with the reforming catalyst.

9. In a process for catalytically reforming low boiling hydrocarbon reactants of gasoline and naptha boiling range comprising the heating of said reactants to a reaction temperature in a preheating zone, passing the heated reactants through a reforming catalyst in an enclosed reaction zone maintained at a desired reaction temperature, withdrawing the reaction products from said reaction zone, reheating said reaction products to the desired reaction temperature in a reheating zone, passing the reheated reactant products through a reforming catalyst in a succeeding enclosed reaction zone, withdrawing, cooling and passing said reaction mixtures to a flashing zone for separation of gas from condensate, the improvement which comprises passing the gas separated from condensate in said flashing zone to an absorption zone, absorbing therein from said gas hydrocarbons having at least three carbon atoms to the molecule by contact with a relatively cool lean oil comprising products of said reforming process, removed from a stripping zone, withdrawing, heating, and passing the resulting enriched lean oil to a stripping zone for removal of absorbed hydrocarbons as overhead vapors, and passing a portion of the resulting stripped lean oil jointly with a catalytically treated reaction mixture to the reheating zone for subsequent contact with the reforming catalyst.

10. In a process for catalytically reforming low boiling hydrocarbon reactants of gasoline and naptha boiling range comprising the heating of said reactants to a reaction temperature in a preheating zone, passing the heated reactants through a reforming catalyst in an enclosed reaction zone maintained at a desired reaction temperature, withdrawing the reaction products from said reaction zone, reheating said reaction products to the desired reaction temperature in a reheating zone, passing the reheated reactant products through a reforming catalyst in a succeeding enclosed reaction zone, withdrawing, cooling and passing said reaction mixtures to a flashing zone for separation of gas from condensate, the improvement which comprises passing the gas separated from a condensate in said flashing zone to an absorption zone, absorbing therein from said gas hydrocarbons having at least three carbon atoms to the molecule by contact with a relatively cool lean oil comprising products of said reforming process, withdrawing, heating, and passing the resulting enriched lean oil to a stripping zone for removal of absorbed hydrocarbons as overhead vapors, and passing a portion of the resulting stripped lean oil jointly with the reactant charging stock of gasoline boiling range to the initial heating zone for subsequent contact with the reforming catalyst.

11. A process in accordance with claim 10 in which the unabsorbed hydrocarbons from said absorption zone are withdrawn as overhead tail gas, compressing a portion of said tail gas and passing said compressed tail gas to the initial heating zone as hydrogen-bearing gas to be heated jointly with the initial charging stock for subsequent contact with reforming catalysts.

CECILIO L. OCON.
ERNEST A. OCON.